(12) United States Patent
Olson et al.

(10) Patent No.: US 6,954,353 B2
(45) Date of Patent: Oct. 11, 2005

(54) MODULAR LOGIC BOARD CHASSIS FOR A DESKTOP COMPUTER

(75) Inventors: Robert Norman Olson, Mountain View, CA (US); David V. Hoenig, Los Gatos, CA (US); Christopher J. Novak, San Jose, CA (US); Glen T. Walters, Moorpark, CA (US)

(73) Assignee: Apple Computers Inc., Cupertino, CA (US)

( * ) Notice: Subject to any disclaimer, the term of this patent is extended or adjusted under 35 U.S.C. 154(b) by 83 days.

(21) Appl. No.: 10/331,831

(22) Filed: Dec. 30, 2002

(65) Prior Publication Data

US 2003/0090867 A1 May 15, 2003

Related U.S. Application Data

(63) Continuation of application No. 09/610,121, filed on Jun. 30, 2000, now Pat. No. 6,519,138, which is a continuation of application No. 09/187,499, filed on Nov. 5, 1998, now abandoned.

(51) Int. Cl.$^7$ ................................................ G06F 1/16

(52) U.S. Cl. .................... 361/683; 361/724; 312/223.1; 312/7.2; 348/836

(58) Field of Search ................................ 361/682, 683, 361/724–727, 7.2, 223.1, 223.2; 348/836, 838, 839

(56) References Cited

U.S. PATENT DOCUMENTS

| | | | | |
|---|---|---|---|---|
| 4,387,951 A | * | 6/1983 | Hall et al. .................. | 361/683 |
| 4,388,671 A | * | 6/1983 | Hall et al. .................. | 361/682 |
| 5,257,163 A | * | 10/1993 | Buist et al. ................. | 361/686 |
| 5,294,994 A | * | 3/1994 | Robinson et al. ........... | 348/825 |
| 5,661,630 A | * | 8/1997 | Levins et al. ............... | 361/683 |
| 5,815,369 A | * | 9/1998 | Quesada ..................... | 361/686 |
| 5,822,181 A | * | 10/1998 | Jung .......................... | 361/683 |
| 5,973,916 A | * | 10/1999 | Han .......................... | 361/682 |
| 6,188,569 B1 | * | 2/2001 | Minemoto et al. .......... | 361/683 |
| 6,216,999 B1 | * | 4/2001 | Olson et al. ................ | 361/683 |

* cited by examiner

*Primary Examiner*—Lisa Lea-Edmonds
(74) *Attorney, Agent, or Firm*—Henneman & Saunders; Larry E. Henneman, Jr.

(57) ABSTRACT

A computer (10) having a monitor housing (12) within which is affixed a logic module (24) having thereon a processor (36), a memory module (38), an internal power connector (39), a fixed disk drive (40), an internal data connector (41), and an external connector panel (46) all generally housed within a sheet metal housing (42) having therein a plurality of perforations (44) for allowing air from a fan assembly (30) to pass therethrough. A power supply (28) and monitor screen (14) are provided in the monitor housing (12) such that when the logic module (24) is mounted and electrically connected within the monitor housing (12) a generally complete computer (10) unit is provided. An auxiliary drive (16) is optionally provided and affixed to the logic module (24) such that the auxiliary drive (16) is externally accessible when the logic module (24) is affixed within the monitor housing (12).

45 Claims, 3 Drawing Sheets

MODULAR LOGIC BOARD CHASSIS FOR A DESKTOP COMPUTER

RELATED APPLICATIONS

This application is a continuation of U.S. patent application Ser. No. 09/610,121, filed Jun. 30, 2000 now U.S. Pat. No. 6,519,138, which is a continuation of U.S. patent application Ser. No. 09/187,499, filed Nov. 5, 1998 now abandoned, both having at least one inventor in common herewith, and being under obligation of assignment to a common assignee. Both parent applications are incorporated herein by reference in their entirety. This application is further related to a co-pending U.S. patent application Ser. No. 09/187,500, filed Nov. 5, 1998, entitled FLOATING MOUNT AND METHOD FOR MOUNTING A DEVICE TO A CHASSIS THEREBY, by David V. Hoenig, Chris J. Novak, Robert N. Olson, and Glen T. Walters, which is incorporated herein by reference in its entirety.

TECHNICAL FIELD

The present invention relates to the field of desktop computers and more specifically to a chassis for a desktop computer wherein a logic board chassis is removably affixed within a computer monitor unit. The predominant current usage of the present inventive modular logic board chassis is in desktop computers for home and office use, wherein it is desirable to have a tidy and compact package while retaining serviceability and other desirable aspects of appearance and functionality.

BACKGROUND ART

Small computer systems generally have at least the following three features; a computer processor unit, a monitor, and a keyboard. Other features, such as a mouse, a removable disk drive, and the like, may optionally be provided. Of the first three listed features, it is known in the art to combine two, or even all three, of these in a single housing, although the computer processor unit, monitor and keyboard are also frequently provided each in its own separate housing. An advantage of separate segregated components is that each such component is readily accessible for adding to or removing subcomponents therefrom. Moreover, if one of such segregated components fails, it can more easily be serviced and, if necessary, replaced. Indeed, a segregated component can easily be temporarily replaced while a failed component is serviced. In short, separate components provide a greater degree of flexibility.

On the other hand, more integrated units provide several distinct advantages. First, such units can be made more attractive to better fit aesthetically into a home or office environment, and such systems also generally take up less overall space. Moreover, the number of external connections and cables are minimized. External cables are generally unsightly and provide an additional source off failure in that the cables and connectors readily come loose and/or are damaged as components are moved around. Also, for many users, the very fact that there is no need to figure out where external cables are to be connected is, in and of itself, a primary advantage.

It would be useful to find a way to maximize the advantages both of segregated and integrated type computer systems. However, to the inventors' knowledge, no method or apparatus for adequately accomplishing this has existed in the prior art.

SUMMARY

Accordingly, it is an object of the present invention to provide an integrated computer wherein components thereof are easily removed and replaced.

It is still another object of the present invention to provide a computer device which is aesthetically pleasing.

It is yet another object of the present invention to provide a computer which requires a minimal number of external connections.

It is still another object of the present invention to provide a computer which can be easily upgraded by an end user.

It is yet another object of the present invention to provide a computer which is economical to produce and reliable in operation.

Various embodiments of the present invention achieve one or more of the above listed objects and/or provide one or more of the advantages listed herein. These objects and advantages of the invention should not, however, be construed as essential elements of the present invention. In fact, it should be understood that various embodiments might provide only a subset of the possible objects and/or advantages without departing from the spirit and scope of the invention.

Briefly, the preferred embodiment of the present invention is a computer housing generally resembling a monitor housing, having a monitor and power supply integral therein. A computer chassis sheet metal structure having active computer components thereon is removably affixed within said computer housing. Electrical connections are made within the chassis and, additionally, a user accessible panel of the chassis has connecting jacks such that external components may optionally be connected thereby. In the particular embodiment of the invention described herein, the chassis further has provision for affixing thereto an auxiliary mass storage device. According to the present inventive structure, electromechanical interference ("EMI") and thermal considerations are optimized to provide a maximum of cooling with a minimum of radiated and conducted emissions. The invention allows assembly of a computer by simply adding the chassis to a display enclosure, making the electrical connections, and attaching a plastic cover. It also allows easy removal of the chassis to enable service or upgrade to the unit, and allows the chassis to be separately tested before assembly into the computer.

It is an advantage of the present invention that high component density is achieved, thus allowing a relatively compact computer device.

It is another advantage of the present invention that chassis connectors are readily accessible, thus providing for the attachment of test equipment, or the like.

It is a further advantage of the present invention that major components of the computer can be readily temporarily and/or permanently replaced.

It is yet another advantage of the present invention that a computer can be made to be aesthetically pleasing while maintaining the accessibility of component devices therein.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible objects or advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects

DETAILED DESCRIPTION

Figure 1:
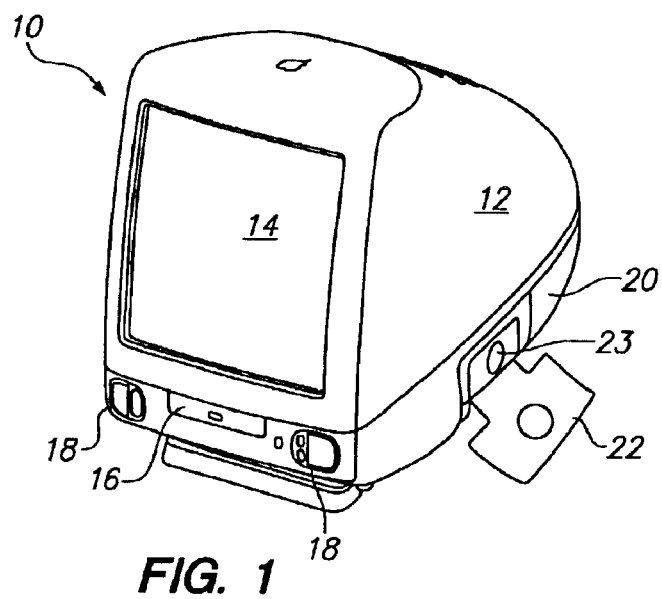
FIG. 1 is a perspective view of an example of a computer according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

Unless otherwise stated herein, component parts of the invention will be familiar to one skilled in the art, and may be purchased or readily manufactured accordingly. Also, unless otherwise stated herein, substitutions can be made for the components described, and each of the individual components, except as specifically claimed, is not an essential element of the invention.

An example of the inventive computer is depicted in a perspective view in FIG. 1, and is designated therein by the general reference character 10. This example of the computer has a monitor housing 12 with a monitor screen 14 mounted therein. In this embodiment, the inventive computer 10 is optionally equipped with features such as an auxiliary disk drive 16 which, in this embodiment is a digital versatile disk ("DVD"), speakers 18 and other such appurtenances not specifically recited herein. One skilled in the art will recognize that the computer 10 will have additional conventional features, such as a keyboard connector for connecting a keyboard (not shown) to the computer 10, a power connector for connecting electrical line power thereto, and the like, which will also not be specifically discussed herein.

A removable primary access panel 20 is shown in the view of FIG. 1 removably affixed to the monitor housing 12. A hinged connector access panel 22 is provided for covering a user access aperture 23 which is provided for accessing therethrough connectors which will be discussed in more detail hereinafter.

Figure 2:
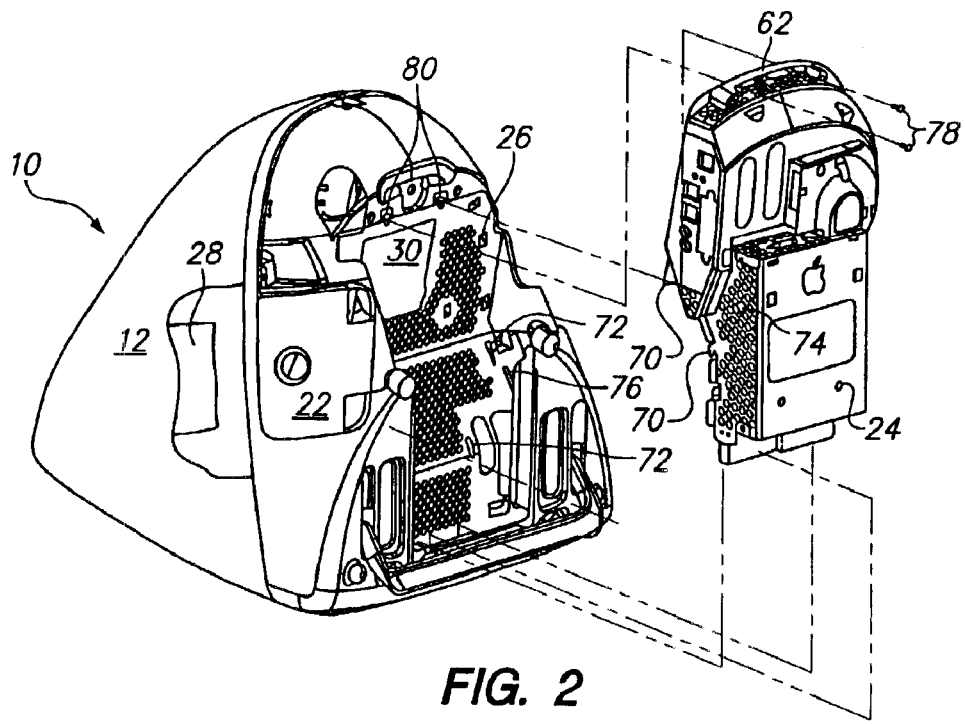
FIG. 2 is an exploded perspective view of the computer of FIG. 1.

FIG. 2 is an exploded perspective view of the computer 10 of FIG. 1, showing the computer 10 rotated such that the monitor screen 14 (not visible in the view of FIG. 2) is facing downward. Furthermore, in the view of FIG. 2, the access panel 20 is removed and is not shown in this view.

A logic module 24 is shown removed from a computer interior chassis 26. The computer interior chassis 26 is an interior structure within the monitor housing 12 to which components within the monitor housing 12 are attached. In this present embodiment of the computer 10 a power supply 28 provides required power to the monitor screen 14 and associated video electronics (not shown), as well as to devices mounted on the logic module 24 to be discussed hereinafter and other devices within the computer 10. A fan assembly 30 draws air through the logic module 24 and the computer interior chassis 26 to cool the interior of the monitor housing 12 and devices therein.

Figure 3:
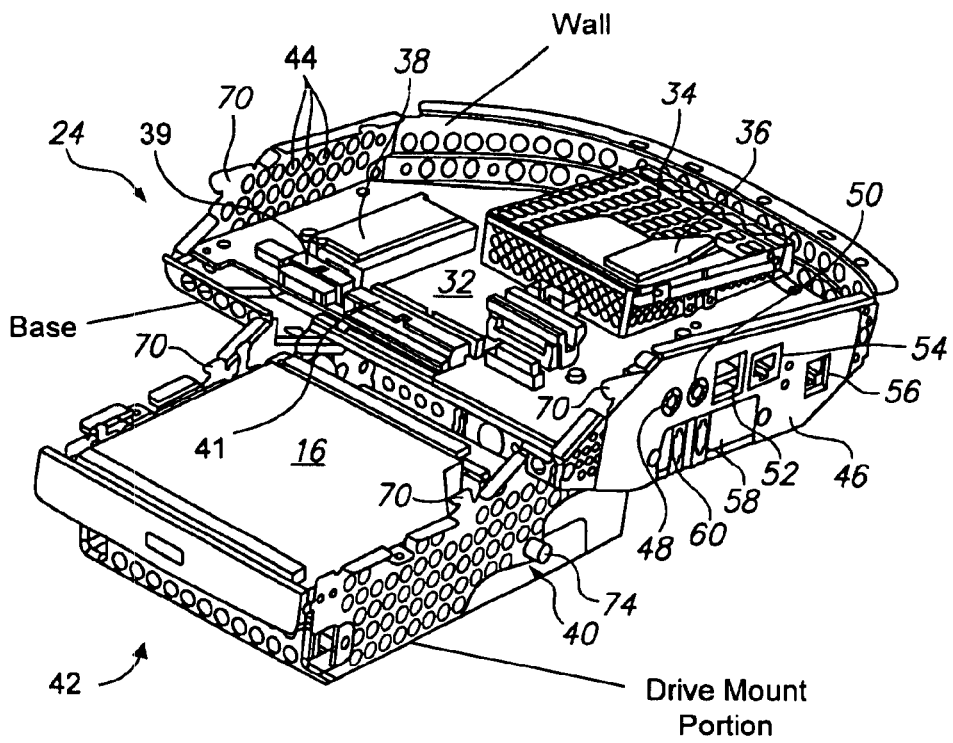
FIG. 3 is a partially cut away perspective view of the logic module of FIG. 2.

FIG. 3 is a partially cut away perspective view of the logic module 24, showing a main logic printed circuit board ("PCB") assembly 32, and a processor PCB enclosure 34 which houses a processor 36. A memory module 38 is the RAM of the computer 10, and a fixed disk drive 40 (hard drive) can be seen within the logic module 24. The PCB assembly 32 further includes a plurality of internal electrical connectors consisting of an internal power connector 39 and an internal data connector 41. Also, in the view of FIG. 3 can be seen the auxiliary drive 16 which, as previously discussed herein, is provided in this example of the computer 10. Not specifically discussed herein are auxiliary components of the main logic PCB assembly 32 which, along with those specifically mentioned, combine such that the logic module 24 is generally functionally equivalent to conventional prior art computers such as might have been configured as a stand alone unit in the prior art, with the significant exception that the present inventive configuration and application provide the advantages recited herein. It will be noted that the components of the main logic PCB assembly 32, including the processor 36, the memory module 38, the fixed disk drive 40, the power connector 39, the data connector 41, the auxiliary drive 16, and others not specifically discussed, will be electrically connected via circuitry on the main logic PCB assembly 32, as well as by wires and subassembly circuit boards not specifically discussed herein. Such electrical connections, while perhaps in some cases themselves unique, do not specifically form a part of this present inventive subject matter, and will not be specifically detailed herein.

The power connector 39 and the data connector 41 automatically align and inherently connect with complementary electrical connectors positioned in the monitor housing 12 when the logic module 24 is engaged in the computer interior chasis 26. In the present embodiment, the power connector 39 receives power from the power supply 28 and the data connector 41 exchanges data (e.g., video data) with monitor components within the monitor housing 12.

It can be seen in the views of FIG. 2 and FIG. 3 that the logic module 24 of this presently described example has a sheet metal housing 42 generally within which are housed the components of the logic module 24 as discussed previously herein. The sheet metal housing 42 is formed from several primary sections, which include a base for accepting the main logic PCB assembly 32, a wall extending from the base and partially surrounding the main logic PCB assembly 32, and a drive mount portion extending forward from and lower than the base for mounting the auxiliary drive 16 to the sheet metal housing 42. The base, wall, and drive mount portion are labeled with legend descriptions in FIG. 3. The sheet metal housing 42 has a plurality of perforations 44 therein such that air can pass therethrough for cooling. An external connector panel 46 is positioned such that, in the assembled computer 10 (FIG. 1) access thereto can be had through the hinged connector access panel 22 (FIG. 1). The external connector panel 46 has a plurality of external connectors 47 including, in this example of the invention, an audio in jack 48, an audio out jack 50, a universal serial bus ("USB") jack 52, an Ethernet jack 54, and a modem jack 56. Also, in the presently described embodiment of the computer 10, is an expansion card slot 58 for optionally mounting thereinto one or more expansion card(s) 60 (two are shown in this example), such as may be developed in the future.

Figure 4:
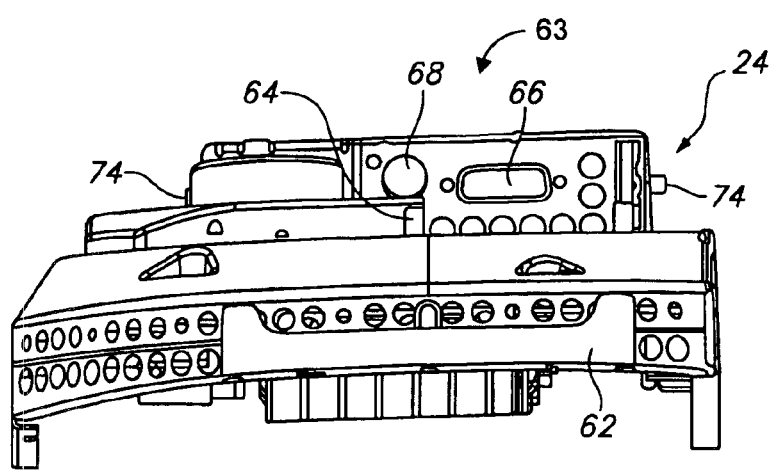
FIG. 4 is an elevational end view of the logic module of FIG. 3.

FIG. 4 is an end view of the logic module 24 showing a handle 62 (also visible in the view of FIG. 2). A plurality of external connectors 63 including, in this embodiment of the invention, a power connector 64, a video connector 66 and an infra red data association ("IrDA") connector 68 are provided for making external electrical connections between the logic module 24 and components outside the monitor housing 12. (It should be noted that connecting cables which might be used to connect between the logic module 24 and components outside the monitor housing 12 are omitted from the view of FIG. 2.) One skilled in the art will recognize that any of many different methods or apparatus could be used, alone or in combination, to make necessary electrical connections between the logic module 24 and components within the monitor housing 12. These include, but are not limited to, electrical connectors which will align and inherently electrically connect when the logic module 24 is positioned and affixed within the monitor housing 12.

While a great variety of attachment devices and/or methods might be employed alone, or in combination, to affix the removable logic module 24 within the monitor housing 12, in this presently described embodiment, a plurality (four, in this example) of hook tabs 70 (two of which are visible in the view of FIG. 2, and all four of which are visible in the view of FIG. 3) are provided on the logic module 24 for insertion into a like plurality of tab slots 72 (FIG. 2) of the interior chassis 26. To further assist in positioning of the logic module 24 within the monitor housing 12 are two alignment pins 74 (one on each side of the sheet metal housing 42, only one of which is visible in the view of FIG. 2 and the view of FIG. 3., and both of which are visible in the view of FIG. 4). The alignment pins 74 are intended to fit into a like plurality of alignment pin slots 76 (one of which is visible in the view of FIG. 2). With the logic module 24 positioned such that the hook tabs 70 are fitted into the tab slots 72 and the alignment pins 74 are fitted into the alignment pin slots 76, the logic module 24 is secured to the interior chassis 26 by screwing two attachment screws 78 into two receiving screw holes 80 in the interior chasis 26, as shown in the view of FIG. 2. Upon inserting and securing the logic module 24 into the interior chasis 26, electrical connections are made between the power supply 28 and the power connector 39 of the logic module 24, and between the internal data connector 41 of the logic module 24 and the appropriate complementary electrical connector within the monitor housing 12, as previously discussed herein.

Figure 5:
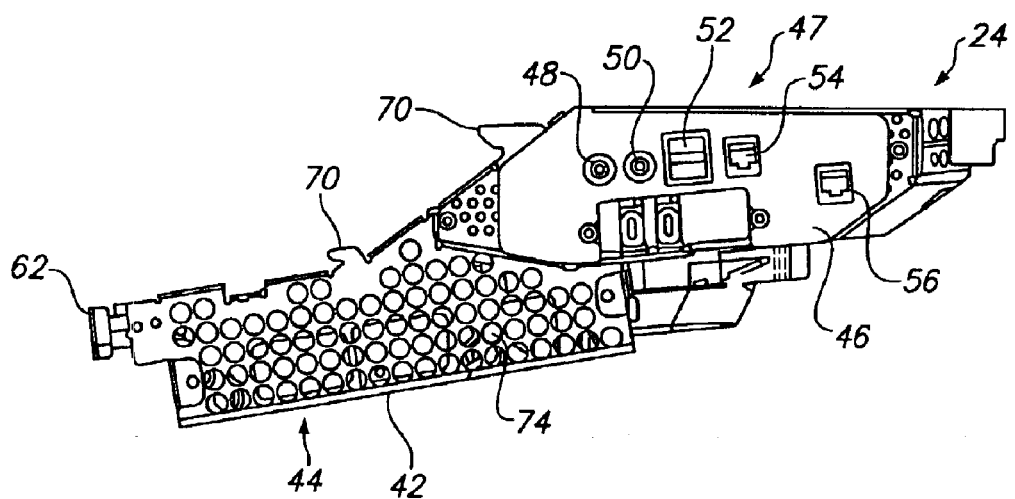
FIG. 5 is a side elevational view of the logic module of FIGS. 3 and 4.

FIG. 5 is a side elevational view of the logic module 24 showing in better detail the external connectors 47 of the external connector panel 46 which, in the assembled computer 10, are accessible through the connector access aperture 23. Also visible in the view of FIG. 5 are one of the alignment pins 74 and two of the hook tabs 70 of the sheet metal housing 42.

According to the present invention, with the logic module 24 affixed within and electrically connected to the monitor housing 12, a generally complete computer 10 is presented, ready to be connected to a keyboard, mouse, external electrical power, and whatever other connections might optionally be desired. The computer 10 is generally more compact and aesthetically pleasing that many prior art component type computer devices, while retaining the easy serviceability and other advantages of such devices. Further, the unique structure of the computer 10 is less likely to suffer failure due to connector malfunction than is a separate component system, even though the advantages of a separate component system are also achieved.

Various modifications may be made to the invention without altering its value or scope. For example, the specific shape, methods or means for attachment, and configuration of the embodiment described herein are all features of the embodiment and are specifically not limitations of the invention. Moreover, it is envisioned by the inventors that many combinations of components, including those discussed herein and others, could be optionally included with or omitted from the invention.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

CORRESPONDENCE CHART

10 COMPUTER
12 MONITOR HOUSING
14 MONITOR SCREEN
16 AUXILIARY DRIVE
18 SPEAKERS
20 PRIMARY ACCESS PANEL
22 CONNECTOR ACCESS PANEL
23 CONNECTOR ACCESS APERTURE
24 LOGIC MODULE
26 INTERIOR CHASSIS
28 POWER SUPPLY
30 FAN ASSEMBLY
32 MAIN LOGIC PCB ASSEMBLY
34 PROCESSOR PCB ENCLOSURE
36 PROCESSOR
38 MEMORY MODULE
40 FIXED DISK DRIVE
42 SHEET METAL HOUSING
44 PERFORATIONS (IN 42)
46 EXTERNAL CONNECTOR PANEL
47 EXTERNAL CONNECTORS
48 AUDIO IN JACK
50 AUDIO OUT JACK
52 USB JACK
54 ETHERNET JACK
56 MODEM JACK
58 EXPANSION CARD SLOT
60 EXPANSION CARDS
62 HANDLE
63 INTERNAL CONNECTORS
64 POWER CONNECTOR
66 VIDEO CONNECTOR
68 IRDA CONNECTOR
70 HOOK TABS
72 TAB SLOTS
74 ALIGNMENT PINS
76 ALIGNMENT PIN SLOTS
78 ATTACHMENT SCREWS
80 SCREW HOLES

We claim:

1. A logic module chassis for engaging the chassis of a monitor unit, said logic module chassis comprising:
    a base defining a generally planar, horizontal surface;
    a circuit board mounted on said base;
    a wall extending from said base and at least partially surrounding said circuit board;
    a drive mount portion coupled to said base, said drive mount portion adapted for mounting at least one auxiliary drive thereto;
    at least one electrical connector for selectively engaging a complementary electrical connector of said monitor unit; and
    a plurality of attachment devices for securing said logic module chassis to said monitor chassis.

2. A logic module chassis according to claim 1, wherein said wall extends around at least a portion of a perimeter of said base.

3. A logic module chassis according to claim 1, wherein said wall defines a plurality of perforations to facilitate airflow through said logic module chassis.

4. A logic module chassis according to claim 1, wherein said electrical connector is fixed to said circuit board.

5. A logic module chassis according to claim 4, wherein said wall includes a relatively lower portion adjacent said electrical connector, such that said wall will not interfere with said engagement of said electrical connector and said complimentary electrical connector.

6. A logic module chassis according to claim 1, wherein said logic module chassis includes an external connector panel accessible to a user when said logic module chassis is secured to said monitor chassis.

7. A logic module chassis according to claim 8, wherein said external connector panel is disposed in said wall of said logic module chassis.

8. A logic module chassis according to claim 1, wherein said drive mount portion extends forward from said base.

9. A logic module chassis according to claim 8, wherein said drive mount portion is positioned lower than said base portion of said logic module chassis.

10. A logic module chassis according to claim 1, wherein said drive mount portion comprises a pair of opposed, perforated walls.

11. A logic module chassis according to claim 10, wherein said drive mount portion further comprises a bottom cover for at least partially enclosing the space between said pair of walls.

12. A logic module chassis according to claim 10, wherein said drive mount portion further comprises a plurality of attachment devices disposed on the top of said pair of walls for engaging said monitor chassis.

13. A logic module chassis according to claim 1, wherein said auxiliary drive comprises a removable media drive mounted in said drive mount portion.

14. A logic module chassis according to claim 13, wherein said removable media drive is accessible through the front of said monitor unit when said logic module chassis is secured to said monitor chassis.

15. A logic module chassis according to claim 1, wherein said drive mount portion includes a plurality of attachment devices for securing said drive mount portion to said monitor chassis.

16. A logic module chassis according to claim 1, wherein said attachment devices are fixed to said wall of said logic module chassis.

17. A logic module chassis according to claim 16, wherein:
    said attachment devices comprise a plurality of hook projections or a plurality of of slots, said plurality of slots for receiving said plurality of hook projections;
    said logic module chassis includes either said plurality of hook projections or said plurality of slots; and
    said monitor chassis includes the other of said hook projections or said slots.

18. A logic module chassis according to claim 16, wherein said attachment devices further included at least one receiving aperture for receiving a fastener to prevent relative movement between said logic module chassis and said monitor chassis.

19. A logic module chassis according to claim 16, wherein at least one of said attachment devices extends vertically from said wall.

20. A logic module chassis according to claim 1, wherein said logic module chassis includes at least one alignment device for aligning said logic module chassis with said monitor chassis during engagement.

21. A logic module chassis according to claim 20, wherein said alignment device comprises:
    either a plurality of alignment projections or a plurality of alignment slots; and wherein
    said monitor chassis includes either a plurality of alignment slots for receiving said alignment projections or a plurality of alignment projections to engage said alignment slots.

22. A logic module chassis according to claim 21, wherein at least a portion of said alignment device is disposed on said drive mount portion of said logic module chassis.

23. A logic module chassis according to claim 1, wherein:
    said circuit board is disposed above said base; and
    said electrical connector is disposed above said circuit board.

24. A logic module chassis according to claim 1, wherein said electrical connector is disposed to engage said complementary connector when moved in a direction parallel to said generally planar surface.

25. A logic module chassis according to claim 1, wherein said circuit board is disposed in a plane generally parallel to said substantially planar surface.

26. A logic module chassis according to claim 1, wherein said drive mount portion facilitates the attachment of a plurality of said auxiliary drives in a stacked arrangement.

27. A logic module chassis for engaging the chassis of a monitor unit, said logic module chassis comprising:
    a base defining a generally planar, horizontal surface;
    a circuit board mounted on said base;
    a wall extending from said base and at least partially surrounding said circuit board;
    a processor enclosure for protecting a processing unit mounted on said circuit board;
    at least one electrical connector for selectively engaging a complementary electrical connector of said monitor unit; and
    a plurality of attachment devices for securing said logic module chassis to said monitor chassis.

28. A logic module chassis according to claim 27, wherein said processor enclosure defines a plurality of perforations to facilitate airflow through said processor enclosure.

29. A logic module chassis for engaging the chassis of a monitor unit, said logic module chassis comprising:
   a base defining a generally planar, horizontal surface;
   a circuit board mounted on said base;
   a wall extending from said base and at least partially surrounding said circuit board;
   at least one electrical connector for selectively engaging a complementary electrical connector of said monitor unit; and
   a plurality of attachment devices for securing said logic module chassis to said monitor chassis; and wherein
   said attachment devices are positioned in complementary attachment devices of said monitor chassis by moving said logic module chassis in a first direction relative to said monitor chassis; and
   said attachment devices engage said complementary attachment devices by moving said logic module chassis in a second direction relative to said monitor chassis.

30. A logic module chassis according to claim 29, wherein engaging said attachment devices with said complementary attachment devices causes said at least one said electrical connector of said logic module chassis to engage said complementary electrical connector of said monitor unit.

31. A logic module chassis according to claim 29, wherein engaging said attachment devices with said complementary attachment devices positions a drive mounted on said logic module chassis in a drive bay opening of said monitor unit.

32. A logic module chassis according to claim 29, wherein engaging said attachment devices with said complementary attachment devices positions an electrical connector panel of said logic module chassis in a connector panel opening of said monitor unit.

33. A logic module chassis according to claim 29, wherein:
   said attachment devices comprise either a plurality of hook projections or a plurality of slots for receiving said plurality of book projections;
   said complementary attachment devices comprise the other of either said plurality of hook projections or said plurality of slots;
   said hook projections are positioned in said slots when said logic module chassis is moved in said first direction; and
   said hook projections are engaged with said slots when said logic module chassis is moved in said second direction, thereby securing said logic module chassis to said monitor chassis.

34. A logic module chassis according to claim 33, wherein said logic module chassis further includes at least one retainer for preventing movement back along said second direction once said logic module chassis is engaged with said monitor chassis.

35. A logic module chassis for engaging the chassis of a monitor unit, said logic module chassis comprising:
   a base defining a substantially planar surface having a circuit board mounted thereon;
   a plurality of attachment devices fixed to said base for securing said logic module chassis to said monitor chassis, and wherein
   said logic module chassis is mounted to said monitor chassis by moving said logic module chassis in a first direction with respect to said monitor chassis; and
   said logic module chassis is secured to said monitor chassis by moving said logic module chassis in a second direction generally parallel to said substantially planar surface.

36. A logic module chassis according to claim 35, wherein:
   said attachment devices comprise either a plurality of hook projections or a plurality of slots for receiving said plurality of hook projections; and
   said monitor chassis includes the other of said hook projections or said slots.

37. A logic module chassis according to claim 36, wherein said logic module chassis includes said hook projections.

38. A logic module chassis according to claim 35, further including at least one electrical connector for selectively engaging a complementary electrical connector of said monitor unit when said logic module chassis is secured to said monitor chassis.

39. A logic module chassis for engaging the chassis of a monitor unit, said logic module chassis comprising:
   a base defining a generally planar, horizontal surface;
   a circuit board mounted on said base;
   a wall extending from said base and at least partially surrounding said circuit board;
   at least one electrical connector for selectively engaging a complementary electrical connector of said monitor unit; and
   a plurality of attachment devices for securing said logic module chassis to said monitor chassis; and wherein
   said wall defines a plurality of perforations disposed to ventilate said logic module chassis via said monitor unit.

40. A logic module chassis for engaging the chassis of a monitor unit, said logic chassis comprising:
   a base defining a generally planar, horizontal surface;
   a circuit board mounted on said base;
   a wall extending from said base and at least partially surrounding said circuit board;
   at least one electrical connector for selectively engaging a complementary electrical connector of said monitor unit;
   a plurality of attachment devices for securing said logic module chassis to said monitor chassis; and
   an open top.

41. A logic module chassis according to claim 40, wherein:
   said circuit board is positioned above said base; and
   said circuit board is accessible from above said base through said open top.

42. A logic module chassis for engaging the chassis of a monitor unit, said logic module chassis comprising:
   a base defining a generally planar, horizontal surface;
   a circuit board mounted on said base;
   a wall extending from said base and at least partially surrounding said circuit board;
   at least one electrical connector for selectively engaging a complementary electrical connector of said monitor unit;
   a plurality of attachment devices for securing said logic module chassis to said monitor chassis;
   a finished portion visible when said logic module chassis is engaged with said monitor chassis; and
   an unfinished portion hidden from view when said logic module chassis is engaged with said monitor chassis.

43. A logic module chassis according to claim 42, wherein said finished portion comprises the underside of said base.

44. A logic module chassis according to claim 42, further comprising:

a drive mount portion coupled to said base, said drive mount portion adapted for mounting at least one auxiliary drive thereto; and wherein said finished portion includes a bottom cover of said drive mount portion.

45. A logic module chassis according to claim 42, further comprising:

a drive mount portion coupled to said base, said drive mount portion having an auxiliary drive mounted therein; and wherein said finished portion includes a front of said auxiliary drive.

* * * * *

UNITED STATES PATENT AND TRADEMARK OFFICE
CERTIFICATE OF CORRECTION

PATENT NO. : 6,954,353 B2
DATED : October 11, 2005
INVENTOR(S) : Olson et al.

It is certified that error appears in the above-identified patent and that said Letters Patent is hereby corrected as shown below:

Title page,
Item [73], Assignee, delete "Apple Computers Inc." and insert -- Apple Computer, Inc. -- in its place.

Signed and Sealed this

Twenty-first Day of March, 2006

JON W. DUDAS
*Director of the United States Patent and Trademark Office*